(No Model.) 2 Sheets—Sheet 1.
E. WESTON.
REGULATOR FOR ELECTRICAL GENERATORS.
No. 289,326. Patented Nov. 27, 1883.
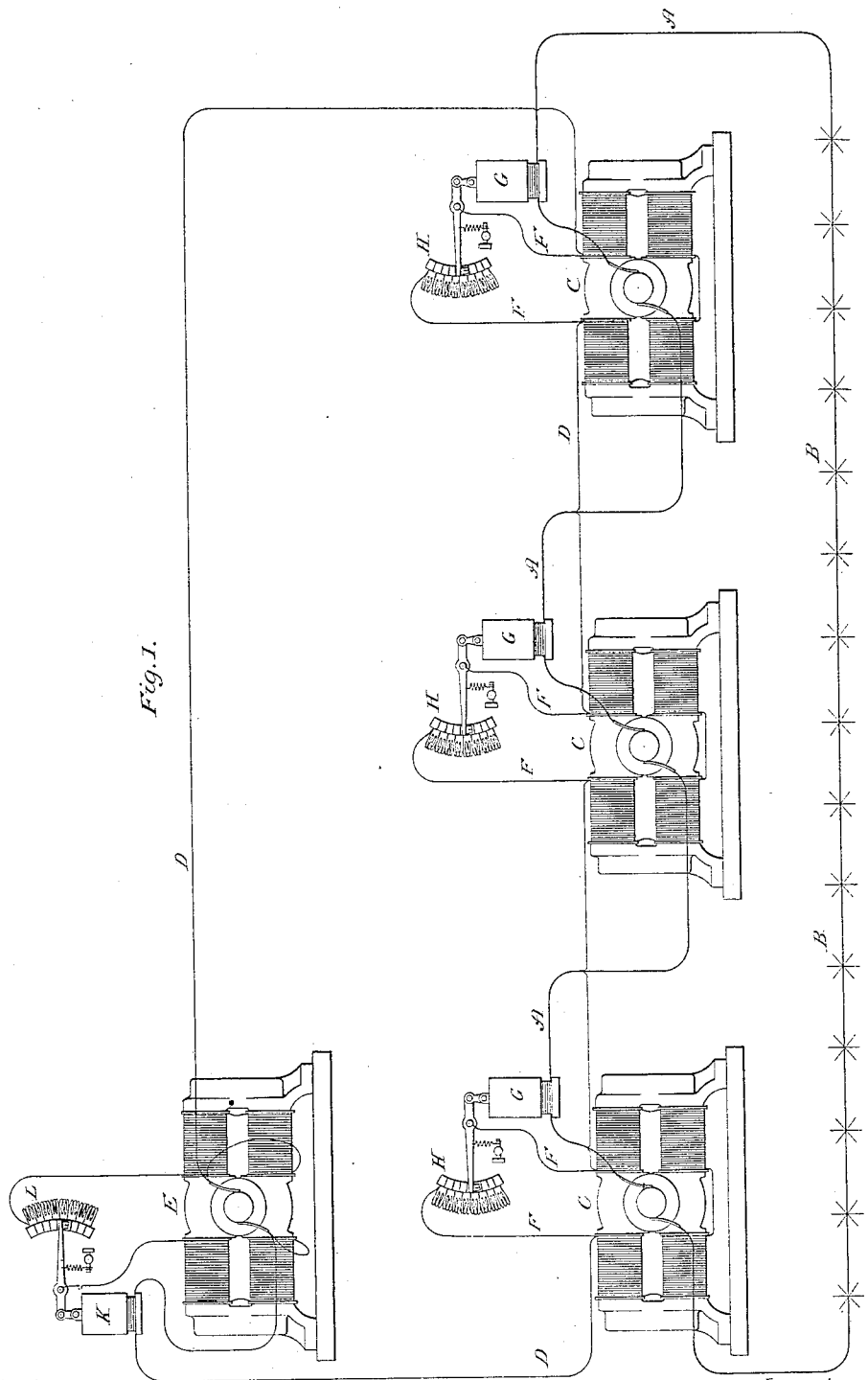
Attest:
Raymond F. Barnes.
W. H. Doggett.
Inventor:
Edward Weston
By Parker W. Page atty (No Model.)　　　　　　　　　　　　　2 Sheets—Sheet 2.
E. WESTON.
REGULATOR FOR ELECTRICAL GENERATORS.
No. 289,326.　　　　　　　　Patented Nov. 27, 1883.
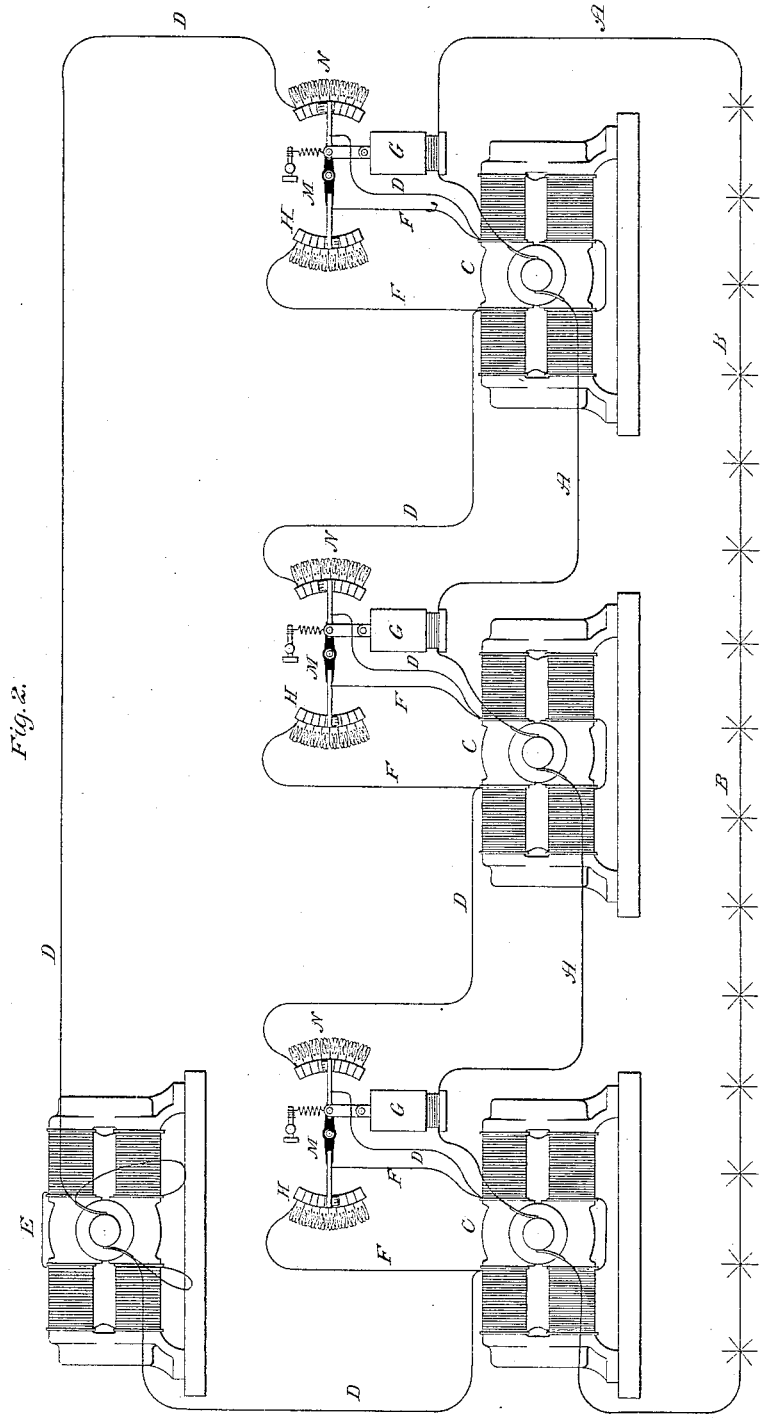

United States Patent Office.

EDWARD WESTON, OF NEWARK, NEW JERSEY, ASSIGNOR TO THE UNITED STATES ELECTRIC LIGHTING COMPANY, OF NEW YORK, N. Y.

REGULATOR FOR ELECTRICAL GENERATORS.

SPECIFICATION forming part of Letters Patent No. 289,826, dated November 27, 1883.

Application filed July 16, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Regulators for Electrical Generators, of which the following is a specification, reference being had to the drawings accompanying and forming a part of the same.

When two or more dynamo or magneto machines are run in series for producing a current suited to such purposes as arc-lighting, it is desirable to have some means of regulation that will maintain a constant flow of current without waste of power. I have invented a system of regulation for accomplishing this, which I have illustrated in a former patent, the same consisting in exciting the field of a machine by a derived circuit from the main conductors, or, in case of two or more machines being used, exciting their fields by including them in series in a derived circuit to all the armatures, and controlling the amount of current flowing in the field-circuit through the instrumentality of an electro-magnet in the main or armature circuit and in series with the lamps or other devices included in that circuit. When several machines of considerable capacity are run in series for supplying the current in a given circuit, the range of regulation necessary or likely to be used is so great that this plan involves certain objections. For instance, the number of resistance-coils necessary for the field-circuit becomes very great, and, again, it is difficult to discontinue the use of one machine of the series without interfering with the action of the others. These difficulties I have obviated by certain methods of regulation invented by me and disclosed in other applications, and also by the plan which forms the subject of my present application. By my present invention I connect up the armatures of a given number of machines in series in the main or working circuit, and the field-magnet coils in an independent circuit, through which flows a uniform or constant current. Around each field is a derived circuit or shunt containing a variable resistance or rheostat, and in the main or working circuits are electro-magnets—one for each resistance—that divert a greater or less amount of current from the field-magnet coils and maintain the current in the working-circuit uniform. In order that the current in the field-circuit may remain constant while the total resistance of the circuit is varied by the action of the regulating-magnets, I may use a regulator with the exciter, or, in other words, the machine which energizes the fields, or I may provide for the insertion of a compensating resistance in the circuit of the exciter when the resistance of the shunts around the field-magnets of the generators is reduced, and conversely.

The nature and purpose of the invention will be more clearly understood by reference to the accompanying drawings, in which—

Figure 1 is a diagram of a system invented by me, and Fig. 2 is a similar diagram of the system with modifications.

Let A A designate any electric circuit, and B B a given number of arc-lamps or similar devices included in series in the circuit. Assume that the number of lamps is such as to make it desirable to connect up two or more generators in series with them in order to run them properly. C C designate these generators.

The field-magnet coils of the generators are included in series in a circuit, D, from an exciter, E, and are therefore electrically independent of the main or working circuit A.

Around each field—that is, between the terminals of the coils on the field-magnets of the generators C C—is a shunt or derived circuit, F, containing a variable resistance or rheostat, H. With each rheostat is employed an electro-magnet, G, in the circuit A and in series with the lamps B, which operates to directly or indirectly vary or control the resistance of the shunts. This may be done by means of a series of plates connected to resistance-coils, and a contact-lever shifted by the movement of the armature of magnet G, or by any other well-known mechanism, such as that described in my Patent No. 278,640, May 29, 1883. When the current in the main circuit A has the normal strength, a given amount of current is flowing through the field-magnet coils of the generators. Should the current in circuit A increase, the magnets G reduce the resistance of the shunt-circuits F, thereby diverting current from the field-magnet coils and weakening the magnetism of the field, and the converse occurs when the main current weakens. Varying the total resistance of the shunts F, however, affects the total resistance of the circuit D, so that, unless provision is made to prevent it, the current in this circuit would not be uniform. I therefore combine with the exciter a regulator to maintain its current uniform, and prefer for this purpose a rheostat or resistance, L, which is included in the derived field-circuit of the exciter, and operated or controlled by an electro-magnet, K, in its armature-circuit D, the operation of such regulator being similar to that described in my Patent No. 278,640, above referred to. Other means may be employed, however, for accomplishing the same purpose. For example, referring to Fig. 2, the levers M, that are operated by the magnets G and caused to vary the resistance of the shunts F, may also be caused to vary the resistances N, included in the circuit D, in such manner that as the resistance in the shunts F is decreased that in the circuit D may be increased accordingly, the total resistance of the circuit D being thus kept the same.

It is obvious that the specific construction of the mechanism for effecting the requisite changes in the resistance of the several circuits may be greatly varied without departing from the invention, the requirements of which are fulfilled by any devices that will maintain a constant flow of current in the circuit D, and vary the amount of current passing through the field-magnet coils of the generators B by diverting more or less current around them, according to the fluctuations in the main circuit A.

Having therefore described my invention, and reserving the right to make subject of other applications features of novelty herein shown or described but not claimed, what I now claim is—

1. The combination, with a main electric circuit and two or more generators included in series therein, of an independent circuit including the field-magnet coils of said generators in series, electro-magnets in the main circuit, means operated thereby for diverting current from the field-magnet coils of the generators, and means for maintaining the flow of current in the field-circuit uniform, substantially as set forth.

2. The combination, with a main electric circuit and two or more generators included in series in said circuit, of an independent circuit including the field-magnet coils of said generators in series, shunt-circuits around the field-magnets, variable resistances included therein, electro-magnets in the main circuit for operating or controlling the resistances, and means for maintaining the flow of current in the field-circuit uniform, all as set forth.

3. The combination, with a main electric circuit and two or more generators included in series therein, of an independent circuit including the field-magnet coils of the generators in series, a generator in the field-circuit, a regulator for maintaining the current from the same uniform, electro-magnets in the main circuit, and means operated or controlled thereby for diverting more or less current around the field-magnets of the generator, all as set forth.

4. In a system of electric-arc lighting, the combination of a main circuit, lamps connected in series therewith, two or more generators with their armature-coils connected in series, an independent circuit including the field-magnet coils of the generators in series, means for diverting the current from said circuit around the field-magnets, electro-magnets in the main circuit and in series with the lamps, for controlling or varying the diversion of current, and means for compensating for such diversion and maintaining the total current in the field-circuit uniform, all substantially as herein set forth.

In testimony whereof I have hereunto set my hand this 14th day of July, 1883.

EDWARD WESTON.

Witnesses:
HENRY A. BECKMEYER,
L. V. E. INNES.